US009688375B2

(12) United States Patent
Kadobayashi

(10) Patent No.: US 9,688,375 B2
(45) Date of Patent: Jun. 27, 2017

(54) FUEL SUPPLY DEVICE, FUEL SUPPLY METHOD AND BOAT PROPULSION DEVICE

(71) Applicant: YAMAHA HATSUDOKI KABUSHIKI KAISHA, Iwata-shi, Shizuoka (JP)

(72) Inventor: Yoshiyuki Kadobayashi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 260 days.

(21) Appl. No.: 14/748,778

(22) Filed: Jun. 24, 2015

(65) Prior Publication Data

US 2016/0039511 A1 Feb. 11, 2016

(30) Foreign Application Priority Data

Aug. 8, 2014 (JP) ................................ 2014-163161

(51) Int. Cl.

| | |
|---|---|
| ***B63H 21/38*** | (2006.01) |
| ***F02B 61/04*** | (2006.01) |
| ***B63H 21/14*** | (2006.01) |
| ***G05D 16/20*** | (2006.01) |
| ***F02M 37/00*** | (2006.01) |
| ***F02M 37/20*** | (2006.01) |

(52) U.S. Cl.

CPC ............ *B63H 21/38* (2013.01); *B63H 21/14* (2013.01); *F02B 61/045* (2013.01); *F02M 37/0082* (2013.01); *F02M 37/20* (2013.01); *G05D 16/2013* (2013.01)

(58) Field of Classification Search

CPC ........ B63H 21/38; B63H 21/14; F02B 61/045
See application file for complete search history.

(56) References Cited

U.S. PATENT DOCUMENTS

| | | | |
|---|---|---|---|
| 4,704,070 | A | 11/1987 | Iseman |
| 5,915,363 | A | 6/1999 | Iwata et al. |
| 2004/0226542 | A1 | 11/2004 | Ekstam |

FOREIGN PATENT DOCUMENTS

| | | | |
|---|---|---|---|
| EP | 0 325 354 | A1 | 7/1989 |
| JP | 10-122077 | A | 5/1998 |
| JP | 2002-130068 | A | 5/2002 |
| JP | 2004-278445 | A | 10/2004 |
| JP | 2010-138776 | A | 6/2010 |
| JP | 2010-174684 | A | 8/2010 |

OTHER PUBLICATIONS

Official Communication issued in corresponding European Patent Application No. 15169744.8, mailed on Jan. 27, 2016.

*Primary Examiner* — Stephen K Cronin
*Assistant Examiner* — Xiao Mo
(74) *Attorney, Agent, or Firm* — Keating and Bennett, LLP

(57) ABSTRACT

A fuel supply device includes a fuel tank, a fuel path, and a fuel pump. The fuel tank includes a fuel storage region including a sealed region configured to store a fuel. The fuel path is connected to an engine and the fuel tank. The fuel path includes a vaporized-liquid fuel mixture suction portion to suck a vaporized-liquid fuel mixture. The vaporized-liquid fuel mixture is produced by mixing the vaporized fuel into the liquid fuel. The vaporized fuel is produced from the liquid fuel stored in the fuel storage region. The fuel pump is disposed in the fuel path. The fuel pump is configured to produce a negative pressure in a pump suction port connected to the vaporized-liquid fuel mixture suction portion.

25 Claims, 13 Drawing Sheets

FUEL SUPPLY DEVICE, FUEL SUPPLY METHOD AND BOAT PROPULSION DEVICE

BACKGROUND OF THE INVENTION

1. Field of the Invention

The present invention relates to a fuel supply device configured to supply fuel to an engine, a fuel supply method, and a boat propulsion device including the fuel supply device.

2. Description of the Related Art

Among fuel supply devices that supply fuel to an engine, one type of fuel supply device is equipped with a supply pump, a fuel tank, and a fuel pump, and is well known (see Japan Laid-open Patent Application Publication Nos. JP-A-H10-122077 and JPA-2002-130068). The supply pump is configured to pressurize and feed a liquid fuel to the fuel tank. The fuel tank includes a float, a float valve, and a fuel inflow pipe. The float floats on the liquid surface of the liquid fuel stored in the fuel tank. The float valve is connected to the float and normally closes the opening of the fuel inflow pipe. The float valve is configured to open the fuel inflow pipe when the position of the float becomes lower than a predetermined position. When the opening of the fuel inflow pipe is opened, the liquid fuel pressurized and fed by the supply pump flows into the fuel tank. The fuel pump is configured to suck the liquid fuel stored in the fuel tank. Thus, in the fuel supply device described in Japan Laid-open Patent Application Publication Nos. JP-A-H10-122077 and JP-A-2002-130068, it is required to dispose the supply pump upstream of the fuel tank, and further to dispose the float and the float valve inside the fuel tank.

In view of the above, Japan Laid-open Patent Application Publication No. JP-A-2010-174684 discloses a method of automatically drawing a liquid fuel into a sub fuel tank from a main fuel tank by causing a fuel pump to suck the liquid fuel within the sub fuel tank under the condition that the sub fuel tank is sealed. A fuel supply device described in the Japan Laid-open Patent Application Publication No. JP-A-2010-174684 is not required to be equipped with a supply pump, a float, a float valve and so forth. Thus, the fuel supply device is simply structured.

However, in the fuel supply device described in Japan Laid-open Patent Application Publication No. JP-A-2010-174684, the sub fuel tank may temporarily run out of the liquid fuel when the engine is restarted after a dead soak. This is due to occurrence of the following phenomenon. The fuel within the fuel paths vaporizes due to an increase in temperature of the surroundings of the engine after the dead soak. The pressure in the fuel paths is increased by the vaporized fuel. Accordingly, the fuel, existing in one of the fuel paths that connects the fuel pump and the main fuel tank and is located upstream of the fuel pump, is pushed back to the main fuel tank. When the engine is restarted under this condition, the fuel pump sucks the fuel within the sub fuel tank and supplies the sucked fuel to an injector. When the sub fuel tank then runs out of the fuel, the liquid fuel is drawn into the sub fuel tank due to negative pressure produced when the fuel pump sucks a gas within the sub fuel tank. However, while sucking only the gas, the fuel pump idles. Thus, sufficient negative pressure cannot be produced in the sub fuel tank. Further, an oil-film seal is not provided inside the fuel pump. Thus, the fuel pump cannot sufficiently exert its pump action. As a result, the liquid fuel cannot be quickly drawn into the sub fuel tank.

SUMMARY OF THE INVENTION

In view of the above, preferred embodiments of the present invention include a sealing structure in a tank so as to produce negative pressure inside the tank by driving a fuel pump, and also use an approach different from well-known approaches, i.e., an approach of supplying a vaporized-liquid fuel mixture to the fuel pump. More specifically, a fuel supply device according to a preferred embodiment of the present invention is configured to supply a fuel to an engine. The fuel supply device includes a fuel tank, a fuel path, and a fuel pump. The fuel tank contains a fuel storage region including a sealed region configured to store the fuel. The fuel path includes a vaporized-liquid fuel mixture suction portion to suck a vaporized-liquid fuel mixture. The vaporized-liquid fuel mixture is produced by mixing a vaporized fuel into a liquid fuel, and the vaporized fuel is produced from the liquid fuel stored in the fuel storage region. The fuel path is connected to the engine and the fuel tank. The fuel pump is disposed in the fuel path. The fuel pump is configured to produce a negative pressure in a pump suction port connected to the vaporized-liquid fuel mixture suction portion.

In the fuel supply device according to a preferred embodiment of the present invention, when the fuel pump is driven and the negative pressure is produced in the pump suction port, the vaporized-liquid fuel mixture produced in the vaporized-liquid fuel mixture suction portion is sucked into the fuel pump through the pump suction port because the fuel storage region is a sealed region. Thus, the vaporized fuel is efficiently sucked out of the fuel storage region. Accordingly, even when the engine is restarted after a dead soak, the negative pressure is promptly produced in the fuel storage region located upstream of the fuel pump. Further, an oil-film seal is maintained inside the fuel pump by sucking the liquid fuel into the fuel pump from the fuel storage region. As a result, the fuel pump continuously exerts its pump action. Thus, the liquid fuel is quickly drawn into the fuel tank, and the fuel is continuously supplied downstream of the fuel pump.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
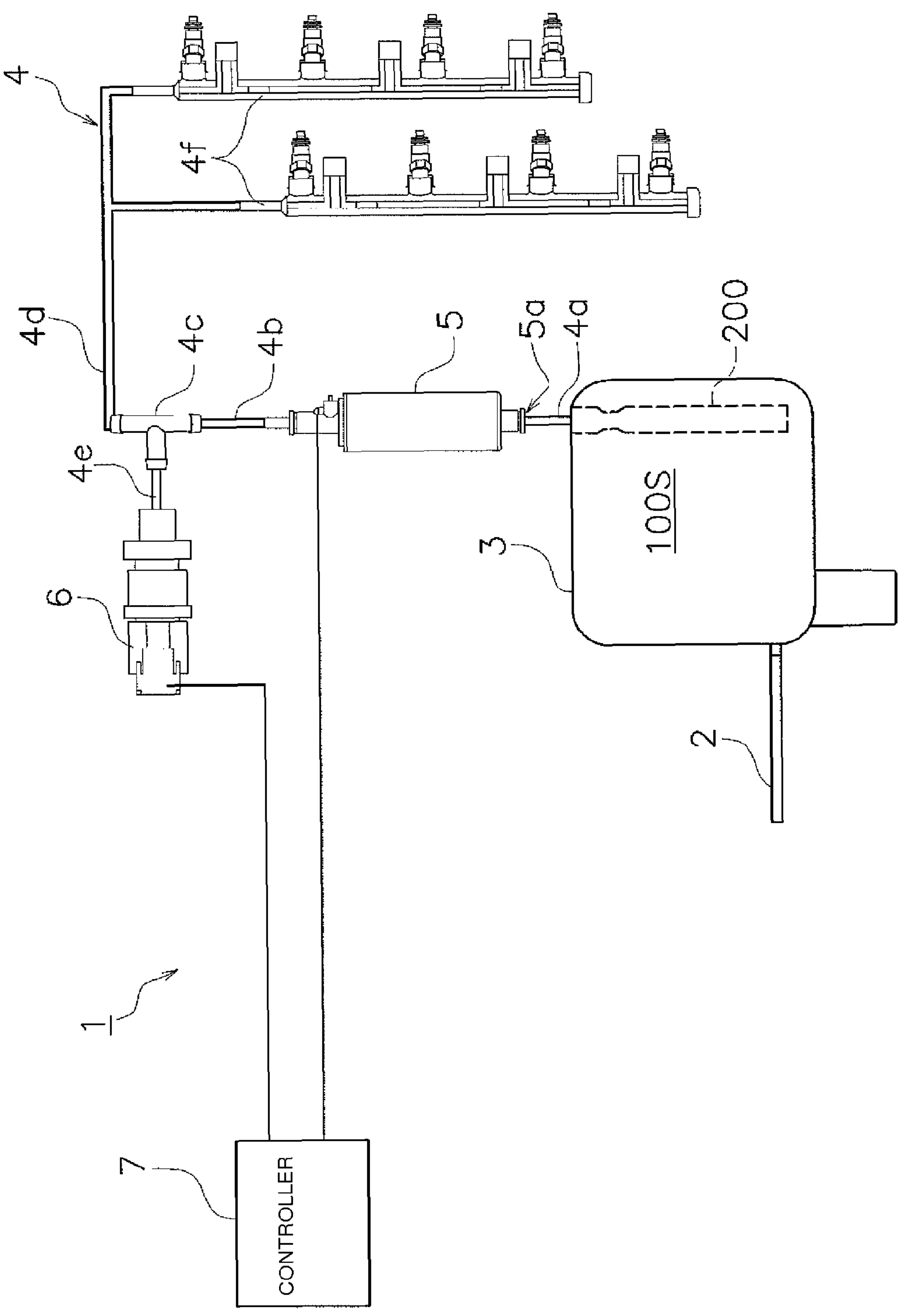
FIG. 1 is a schematic diagram of a structure of a fuel supply device according to a first preferred embodiment of the present invention.

A structure of a fuel supply device 1 for supplying fuel to an engine will be hereinafter explained. FIG. 1 is a schematic diagram of a structure of the fuel supply device 1 according to a first preferred embodiment of the present invention.

The fuel supply device 1 includes a fuel supply pipe 2, a fuel tank 3, a fuel path 4, a fuel pump 5, a fuel pressure sensor 6, and a controller 7.

The fuel supply pipe 2 is connected to the fuel tank 3. The fuel supply pipe 2 directs the fuel to the fuel tank 3.

The fuel tank 3 includes a fuel storage region 100S configured to store the fuel fed thereto through the fuel supply pipe 2. The fuel storage region 100S is a sealed region with liquid tight properties and gas tight properties. The fuel storage region 100S does not include a port opened to the atmosphere. In the fuel storage region 100S, the vaporized fuel is produced as a result of vaporization of the liquid fuel. Thus, the fuel storage region 100S stores both the liquid fuel (hereinafter referred to as "a liquid fuel") and the vaporized fuel (hereinafter referred to as "a vaporized fuel") in a sealed condition. The structure of the fuel tank 3 will be described below.

The fuel path 4 is connected to the fuel tank 3 and the engine (not shown in the drawings). The fuel path 4 includes a first fuel hose 4*a*, a second fuel hose 4*b*, a branch pipe 4*c*, a third fuel hose 4*d*, a fourth fuel hose 4*e*, and a fuel injection device 4*f*.

The first fuel hose 4*a* is connected to the fuel tank 3 and the fuel pump 5. The first fuel hose 4*a* includes a vaporized-liquid fuel mixture suction portion 200 disposed within the fuel storage region 100S of the fuel tank 3. The vaporized-liquid fuel mixture suction portion 200 is configured to suck in a mixture of the liquid fuel and the vaporized fuel (hereinafter referred to as "vaporized-liquid fuel mixture") stored in the fuel storage region 100S. The structure of the vaporized-liquid fuel mixture suction portion 200 will be described below.

The second fuel hose 4*b* is connected to the fuel pump 5 and the branch pipe 4*c*. The third fuel hose 4*d* is connected to the branch pipe 4*c* and the fuel injection device 4*f*. The fourth fuel hose 4*e* is connected to the branch pipe 4*c* and the fuel pressure sensor 6. The fuel injection device 4*f* is attached to an intake system of the engine.

The fuel pump 5 is disposed in the fuel path 4. The fuel pump 5 is disposed between the first fuel hose 4*a* and the second fuel hose 4*b*. The fuel pump 5 includes a pump suction port 5*a*. The pump suction port 5*a* is connected to the vaporized-liquid fuel mixture suction portion 200 through the first fuel hose 4*a*.

A self-priming pump is preferably used as the fuel pump 5. Further, a positive displacement pump is preferably used as the self-priming pump. A reciprocating positive displacement pump (a plunger pump, a piston pump, etc.) and a rotary positive displacement pump (a gear pump, etc.) and so forth are types of positive displacement pumps. The fuel pump 5 is preferably compatible with a PWM (Pulse Width Modulation) control, but is not limited to this configuration.

The fuel pump 5 is configured to produce negative pressure in the pump suction port 5*a*. When the fuel pump 5 is driven and the negative pressure is produced in the pump suction port 5*a*, a vaporized-liquid fuel mixture produced in the vaporized-liquid fuel mixture suction portion 200 is sucked into the fuel pump 5 and a liquid fuel is drawn into the fuel storage region 100S. This is because the fuel storage region 100S is a sealed region. Thus, a vaporized fuel is efficiently sucked out of the fuel storage region 100S. The fuel storage region 100S is thus inhibited from completely running out of the liquid fuel even after a dead soak. Therefore, the fuel pump 5 continuously exerts its pump action, and an oil-film seal is maintained inside the fuel pump 5. As a result, the liquid fuel is quickly drawn into the fuel tank 3. Further, the fuel tank 3 is compactly configured due to the advantageous effect of inhibiting the fuel storage region 100S from completely running out of the liquid fuel.

The fuel pump 5 is preferably a so-called high pressure pump configured to produce a discharge pressure greater than or equal to a pressure at which the vaporized fuel contained in the vaporized-liquid fuel mixture liquefies. The discharge pressure of the fuel pump 5 is preferably set to be greater than or equal to the maximum target fuel pressure (e.g., about 300 kPa) to reliably cause the fuel injection device 4*f* to inject a required amount of the fuel with a fully opened throttle valve. The maximum target fuel pressure is only required to be greater than or equal to a Reid vapor pressure exerted at about 37.8 degrees Celsius, for example. The suction amount per unit time of the fuel pump 5 is preferably greater than the amount of the vaporized-liquid fuel mixture (i.e., sum of the liquid fuel and the vaporized fuel) to be sucked per unit time. The fuel pump 5 is configured to compress and liquefy the vaporized fuel contained in the vaporized-liquid fuel mixture and then discharge the liquefied fuel to the second fuel hose 4*b*. The vaporized fuel is thus liquefied in the fuel pump 5, and hence, occurrence of vapor lock is prevented in the fuel pump 5 while the vaporized fuel within the fuel storage region 100S is actively consumed together with the liquid fuel.

The fuel pressure sensor 6 is connected to the fourth fuel hose 4*e*. The fuel pressure sensor 6 is configured to detect the pressure of the fuel discharged into the fuel path 4 from the fuel pump 5 (hereinafter referred to as "actual fuel pressure"). The fuel pressure sensor 6 is configured to output a detection value of the actual fuel pressure to the controller 7.

The controller 7 is configured and/or programmed to control the discharge pressure of the fuel pump 5 based on the detection value of the actual fuel pressure detected by the fuel pressure sensor 6. Specifically, the controller 7 is configured and/or programmed to obtain the actual fuel pressure within the fuel path 4 from the fuel pressure sensor 6 and obtain the intake pressure of the intake system of the engine from an intake pressure sensor (not shown in the drawings) attached to the intake system. The controller 7 is configured and/or programmed to calculate a first differential pressure by subtracting the intake pressure from the actual fuel pressure. Further, the controller 7 is configured and/or programmed to calculate a second differential pressure by subtracting the first differential pressure from a preliminarily set target fuel pressure. The target fuel pressure is a fuel pressure that reliably causes the fuel injection device 4*f* to inject the required amount of the fuel, and is set based on an engine rotation speed and the intake pressure.

The controller 7 is configured and/or programmed to set a gain value to modify the discharge pressure of the fuel pump 5 based on the second differential pressure. Further, the controller 7 is configured and/or programmed to set a control value of the fuel pump 5 based on the gain value. When the fuel pump 5 is compatible with a PWM control, the control value of the fuel pump 5 is a duty cycle in the PWM control of the fuel pump 5. Thus, the control value of the fuel pump 5 is considered as a load of the fuel pump 5. The controller 7 is configured and/or programmed to control the discharge pressure of the fuel pump 5 by outputting the control value to the fuel pump 5.

Figure 2:
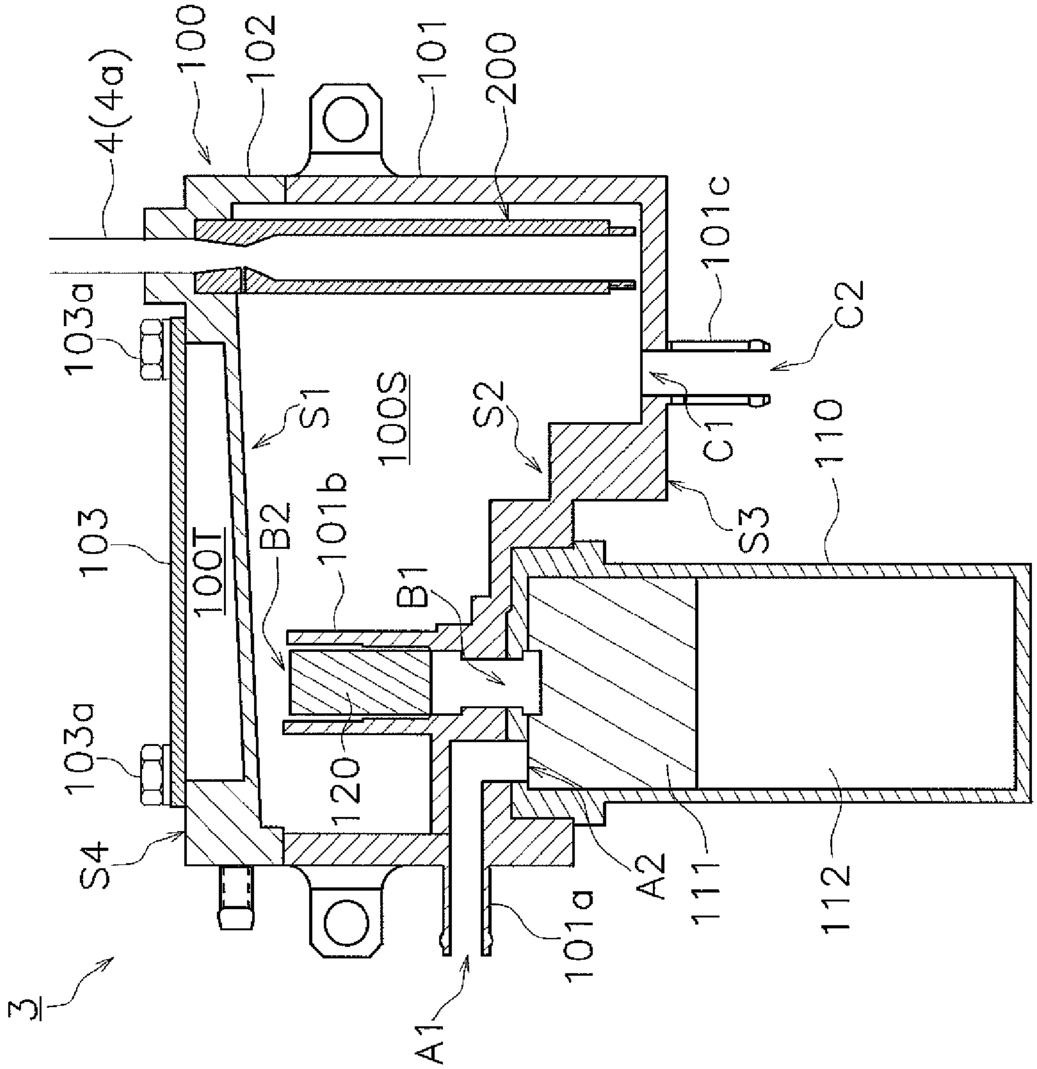
FIG. 2 is a cross-sectional view of an internal structure of a fuel tank according to the first preferred embodiment of the present invention.

Next, a structure of the fuel tank 3 will be explained. FIG. 2 is a cross-sectional view of an internal structure of the fuel tank 3.

The fuel tank 3 includes a chassis 100, a filtration filter 110, and a strainer 120.

The chassis 100 includes the fuel storage region 100S, a coolant path 100T, a lower case 101, an upper case 102, and a cover 103.

The fuel storage region 100S is defined by a space between the lower case 101 and the upper case 102. Adhesion between the lower case 101 and the upper case 102 reliably achieves liquid tight properties and gas tight properties of the fuel storage region 100S. The liquid fuel and the vaporized fuel are both stored in the fuel storage region 100S.

The vaporized-liquid fuel mixture suction portion 200 of the fuel path 4 is fixed to a top surface S1 of the fuel storage region 100S. The height of the top surface S1 preferably gradually increases toward the vaporized-liquid fuel mixture suction portion 200. It is thus possible to reduce the volume of a portion of the fuel storage region 100S occupied by the vaporized fuel. In other words, it is possible to increase the amount of the liquid fuel stored in the fuel storage region 100S. In the present preferred embodiment, the vaporized-liquid fuel mixture suction portion 200 is disposed at an end of the fuel storage region 100S. Thus, the height of the top surface S1 increases from one end of the top surface S1 to the other end thereof. However, the structure of the top surface S1 is not limited to this. For example, when the vaporized-liquid fuel mixture suction portion 200 is disposed in the middle of the fuel storage region 100S, it is only required to set the height of the middle portion of the top surface S1 to be higher than that of the outer peripheral portion thereof. Further, the top surface S1 is only required to have a height gradually increasing toward the vaporized-liquid fuel mixture suction portion 200. Thus, the top surface S1 may have a planar shape as shown in FIG. 2, or alternatively, may have a stepped shape.

The height of a bottom surface S2 of the fuel storage region 100S preferably decreases toward the vaporized-liquid fuel mixture suction portion 200. In the present preferred embodiment, the vaporized-liquid fuel mixture suction portion 200 is disposed at the end of the fuel storage region 100S. Thus, the height of the bottom surface S2 decreases from one end of the bottom surface S2 to the other end thereof. However, the structure of the bottom surface S2 is not limited to this. For example, when the vaporized-liquid fuel mixture suction portion 200 is disposed in the middle of the fuel storage region 100S, it is only required to set the height of the middle portion of the bottom surface S2 to be lower than that of the outer peripheral portion thereof. Further, the bottom surface S2 is only required to have a height gradually decreasing toward the vaporized-liquid fuel mixture suction portion 200. Thus, the bottom surface S2 may have a stepped shape as shown in FIG. 2, or alternatively may have a planar shape.

The coolant path 100T is defined by a space between the upper case 102 and the cover 103. The coolant path 100T is a sealed region that enables a coolant to circulate therethrough. Adhesion between the upper case 102 and the cover 103 reliably achieves liquid tight properties of the coolant path 100T. The coolant path 100T is located above the fuel storage region 100S. The vaporized fuel is cooled down within the fuel storage region 100S by the circulation of the coolant through the coolant path 100T.

The lower case 101 preferably has the shape of a cup. The lower case 101 is preferably made of a material including resin, metal or so forth. The lower case 101 includes a connector 101*a*, a fuel inflow pipe 101*b*, and a drain 101*c*.

The tip of the fuel supply pipe 2 is connected to the connector 101*a*. The connector 101*a* includes an inlet port A1 and an outlet port A2. The fuel flows into the inlet port A1 from the fuel supply pipe 2 and flows out of the outlet port A2 to the filtration filter 110.

The fuel inflow pipe 101*b* protrudes from the bottom surface S2 of the fuel storage region 100S. The fuel inflow pipe 101*b* extends in the up-and-down direction within the fuel storage region 100S. The fuel inflow pipe 101*b* includes an inlet port B1 and an outlet port B2. The inlet port B1 extends through a lower surface S3 of the lower case 101. The outlet port B2 is provided in the upper end of the fuel inflow pipe 101*b*. The fuel flows into the inlet port B1 from the filtration filter 110 and flows out of the outlet port B2 to the fuel storage region 100S. The fuel inflow pipe 101*b* functions as a wall that reliably stores a required amount of the liquid fuel in the fuel storage region 100S.

The drain 101*c* is connected to the lower surface S3 of the lower case 101. The drain 101*c* includes an inlet port C1 and an outlet port C2. The inlet port C1 extends through the bottom surface S2 of the fuel storage region 100S. The outlet port C2 is provided in the lower end of the fuel inflow pipe 101*b*.

The upper case 102 is disposed on the lower case 101. The upper case 102 is fixed to the lower case 101 so as to be adhered to each other. The sealed space produced between the lower case 101 and the upper case 102 defines the fuel storage region 100S. The upper case 102 includes a recess on an upper surface S4 thereof, and the recess defines a portion of the coolant path 100T. The lower surface of the upper case 102 defines the top surface S1 of the fuel storage region 100S.

The cover 103 covers the recess on the upper surface S4 of the upper case 102. The cover 103 is fixed to the upper case 102 by fixtures 103*a* so as to be adhered thereto. The sealed space between the upper case 102 and the cover 103 defines the coolant path 100T.

The filtration filter 110 is attached to the lower surface S3 of the lower case 101. The filtration filter 110 is connected to the lower end of the fuel inflow pipe 101*b*. The filtration filter 110 accommodates a paper filter 111 and a water separation filter 112. The paper filter 111 removes foreign objects from the fuel flowing therein through the connector 101*a*. The water separation filter 112 separates water mixed into the fuel passing through the paper filter 111. The fuel, passing through the water separation filter 112, flows into the inlet port B1 of the fuel inflow pipe 101*b*.

The strainer 120 is disposed inside the fuel inflow pipe 101*b*. The strainer 120 removes foreign objects from the fuel passing through the water separation filter 112. The fuel, passing through the strainer 120, flows into the fuel storage region 100S through the outlet port B2 of the fuel inflow pipe 101*b*.

Figure 3:
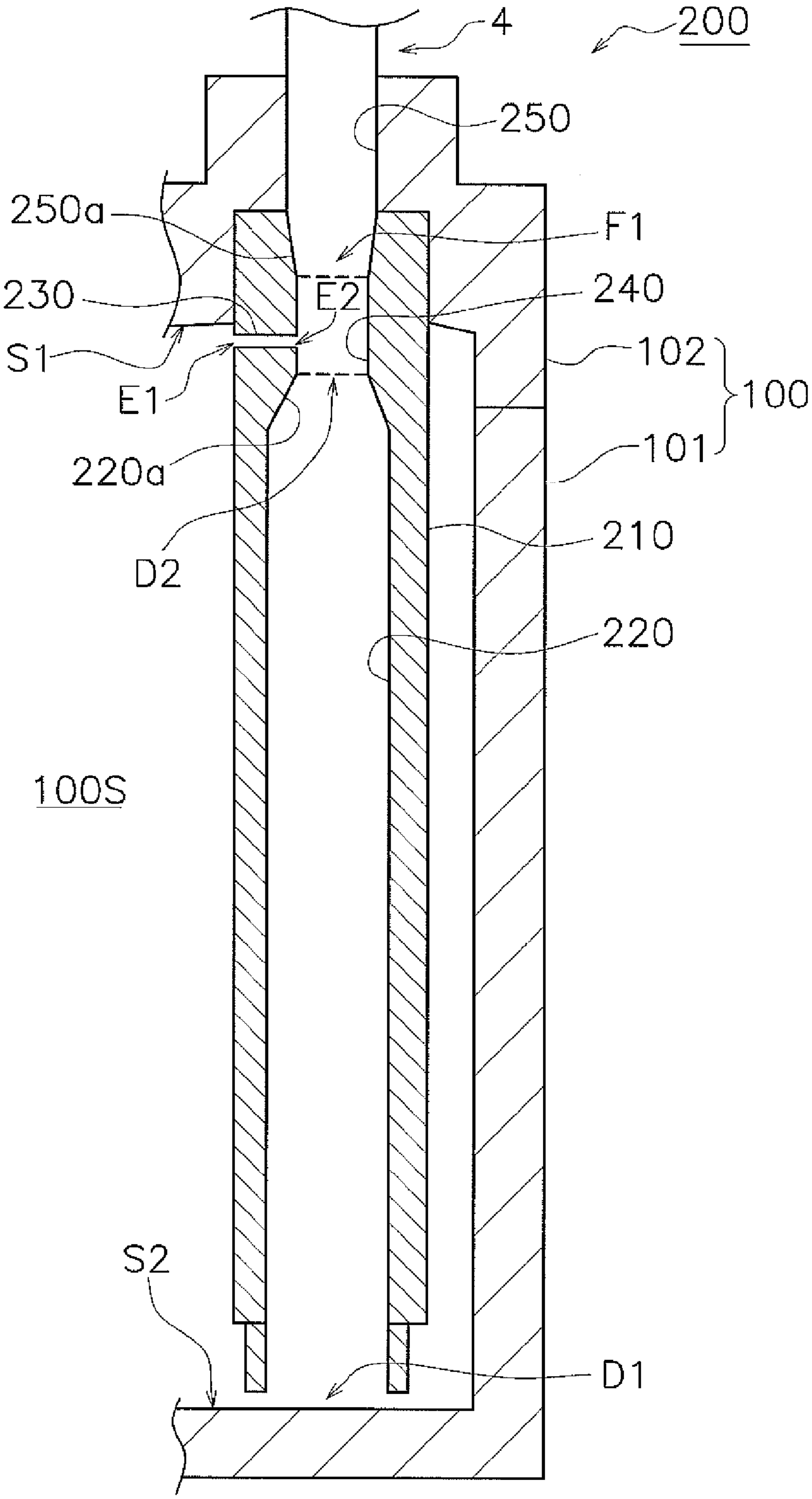
FIG. 3 is a cross-sectional view of a vaporized-liquid fuel mixture suction portion according to the first preferred embodiment of the present invention.

Next, a structure of the vaporized-liquid fuel mixture suction portion 200 will be explained. FIG. 3 is a cross-sectional view of the vaporized-liquid fuel mixture suction portion 200.

The vaporized-liquid fuel mixture suction portion 200 includes a body 210, a liquid fuel path 220, a vaporized fuel path 230, a venturi path 240, and a vaporized-liquid fuel mixture path 250.

The body 210 preferably has the shape of a rod. The body 210 is preferably made of a material including resin, metal or so forth. The liquid fuel path 220, the vaporized fuel path 230, the venturi path 240 and the vaporized-liquid fuel mixture path 250 are arranged in the interior of the body 210.

The liquid fuel path 220 is connected to the upstream side of the venturi path 240. The liquid fuel path 220 includes a liquid fuel suction port D1 and a liquid fuel discharge port D2. The liquid fuel suction port D1 is located at an end of the body 210. The liquid fuel suction port D1 is located in the lower end of the fuel storage region 100S. In the present preferred embodiment, the liquid fuel suction port D1 is opposed to the bottom surface S2 of the fuel storage region 100S. The liquid fuel discharge port D2 is located on the opposite side of the liquid fuel suction port D1. The liquid fuel discharge port D2 is located at the entrance of the venturi path 240. Thus, the liquid fuel path 220 communicates with the fuel storage region 100S and the venturi path 240. During normal operation, the liquid fuel suction port D1 is constantly submerged in the liquid fuel. Thus, the liquid fuel is sucked into the liquid fuel suction port D1 and is discharged out of the liquid fuel discharge port D2.

The liquid fuel path 220 includes a constricted portion 220*a* connected to the venturi path 240. The constricted portion 220*a* tapers toward the venturi path 240. Thus, the inner diameter of the constricted portion 220*a* gradually decreases toward the venturi path 240. The flow rate of the liquid fuel flowing through the liquid fuel path 220 increases in the constricted portion 220*a*.

The vaporized fuel path 230 is connected to a lateral side of the venturi path 240. In other words, the vaporized fuel path 230 is arranged perpendicular or substantially perpendicular to the venturi path 240. The vaporized fuel path 230 includes a vaporized fuel suction port E1 and a vaporized fuel discharge port E2. The vaporized fuel suction port E1 is located in the lateral surface of the body 210. The vaporized fuel suction port E1 is located higher than the liquid fuel suction port D1 of the liquid fuel path 220. The vaporized fuel suction port E1 is located in the upper end of the fuel storage region 100S. The vaporized fuel suction port E1 is located below the highest portion of the top surface S1 of the fuel storage region 100S. The vaporized fuel discharge port E2 is located in the lateral surface of the venturi path 240. Thus, the vaporized fuel path 230 communicates with the fuel storage region 100S and the venturi path 240. The vaporized fuel suction port E1 is exposed above the liquid fuel, and thus, the vaporized fuel is sucked into the vaporized fuel suction port E1 and is discharged from the vaporized fuel discharge port E2. It should be noted that, when the liquid surface of the liquid fuel becomes higher than the vaporized fuel suction port E1 in the fuel storage region 100S, the liquid fuel is sucked into the vaporized fuel suction port E1 and is discharged from the vaporized fuel discharge port E2.

The venturi path 240 is connected to the downstream side of the liquid fuel path 220. The venturi path 240 is defined by a partial constriction in the fuel path 4. The liquid fuel is discharged from the liquid fuel discharge port D2 of the liquid fuel path 220 into the venturi path 240. The flow rate of the fuel flowing through the venturi path 240 is greater than that of the liquid fuel flowing through the liquid fuel path 220. Thus, negative pressure is produced in the venturi path 240 due to the venturi effect. Accordingly, the vaporized fuel is sucked into the venturi path 240 from the vaporized fuel discharge port E2. Thus, in the venturi path 240, the vaporized fuel sucked through the vaporized fuel path 230 mixes with the liquid fuel sucked through the liquid fuel path 220. Consequently, the vaporized-liquid fuel mixture is produced within the venturi path 240.

The vaporized-liquid fuel mixture path 250 is connected to the downstream side of the venturi path 240. The vaporized-liquid fuel mixture path 250 includes a vaporized-liquid fuel mixture suction port F1. The vaporized-liquid fuel mixture suction port F1 is located at the exit of the venturi path 240. The vaporized-liquid fuel mixture produced within the venturi path 240 is sucked into the vaporized-liquid fuel mixture path 250 through the vaporized-liquid fuel mixture suction port F1. The vaporized-liquid fuel mixture, sucked into the vaporized-liquid fuel mixture path 250 through the vaporized-liquid fuel mixture suction port F1, flows toward the fuel pump 5.

The vaporized-liquid fuel mixture path 250 includes an expanded portion 250*a* connected to the venturi path 240. The expanded portion 250*a* tapers toward the venturi path 240. The inner diameter of the expanded portion 250*a* gradually increases in a direction opposite to the venturi path 240. The flow rate of the vaporized-liquid fuel mixture flowing through the vaporized-liquid fuel mixture path 250 decreases in the expanded portion 250*a*.

Next, the cross-sectional areas of the respective paths and the opening areas of the respective ports will be explained. In the following explanation, the term "cross-sectional area" indicates an area of a cross-section orthogonal to the center axis of each path.

The cross-sectional area of the liquid fuel path 220 gradually decreases in the constricted portion 220*a*. The cross-sectional area of the vaporized fuel path 230 is preferably constant. The cross-sectional area of the venturi path 240 is preferably constant. The cross-sectional area of the vaporized-liquid fuel mixture path 250 gradually increases in the expanded portion 250*a*. The cross-sectional area of the vaporized fuel path 230 is smaller than that of the venturi path 240. The cross-sectional area of the vaporized fuel path 230 is smaller than the minimum cross-sectional area of the liquid fuel path 220 and that of the vaporized-liquid fuel mixture path 250. The cross-sectional area of the venturi path 240 is preferably equivalent to the minimum cross-sectional area of the liquid fuel path 220 and that of the vaporized-liquid fuel mixture path 250.

The opening area of the liquid fuel suction port D1 is larger than that of the liquid fuel discharge port D2. The opening area of the liquid fuel discharge port D2 is preferably equivalent to that of the vaporized-liquid fuel mixture suction port F1. The opening area of the vaporized fuel suction port E1 is preferably equivalent to that of the vaporized fuel discharge port E2. The opening area of the vaporized fuel suction port E1, as well as that of the vaporized fuel discharge port E2, is smaller than that of the liquid fuel suction port D1, that of the liquid fuel discharge port D2, and that of the vaporized-liquid fuel mixture suction port F1. The opening area of the vaporized fuel suction port E1, as well as that of the vaporized fuel discharge port E2, is preferably set to be approximately 4%, for example, of that of the venturi path 240.

Next, conditions of the liquid fuel and flows of the vaporized fuel will be explained. FIGS. 4 to 8 are schematic diagrams for explaining the conditions of the liquid fuel and the flows of the vaporized fuel in the fuel tank 3 on a time-series basis. In each of FIGS. 4 to 8, the condition of the liquid fuel is depicted with hatching, whereas the flow of the vaporized fuel is depicted with arrows.

Figure 4:
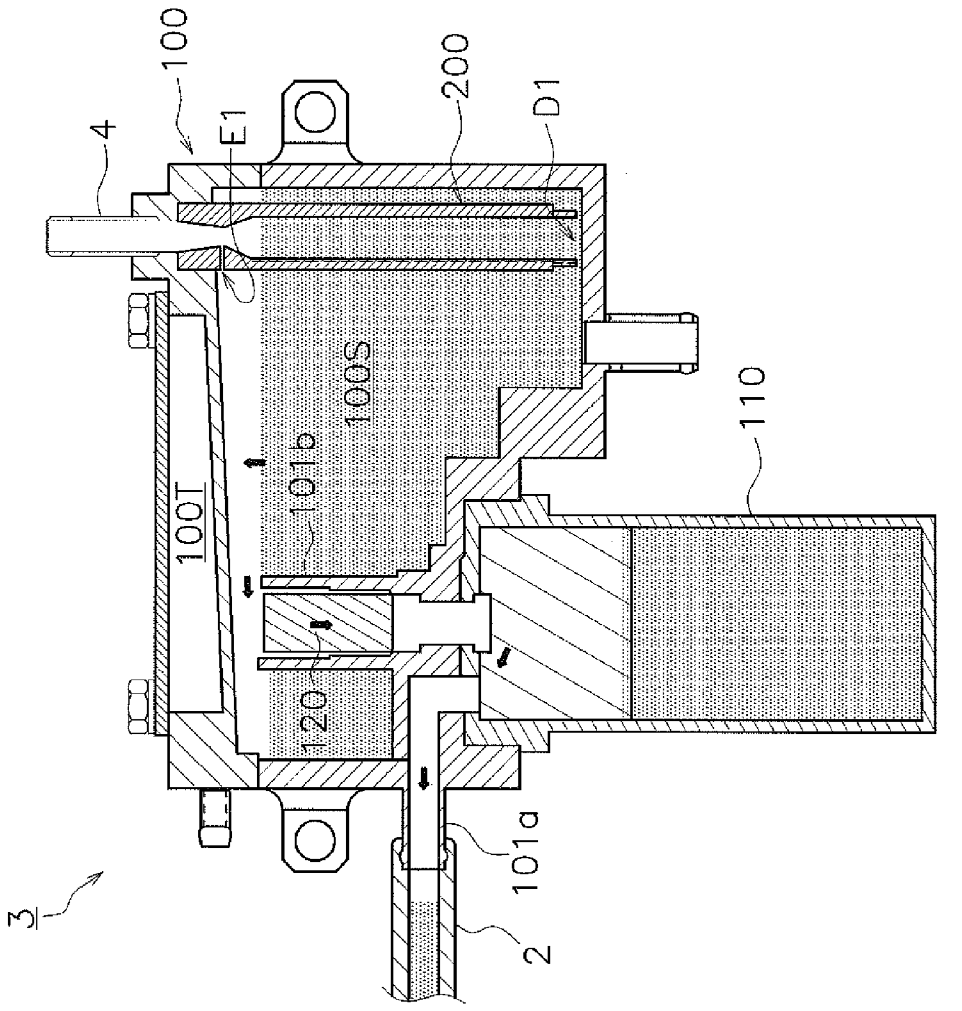
FIG. 4 is a schematic diagram for explaining a condition of a liquid fuel and a flow of a vaporized fuel inside the fuel tank on a time-series basis.

First, as shown in FIG. 4, when the engine is stopped, the liquid fuel inside the filtration filter 110 and the strainer 120 is pushed back to the interior of the fuel supply pipe 2 by the pressure of the vaporized fuel produced in the fuel storage region 100S.

Figure 5:
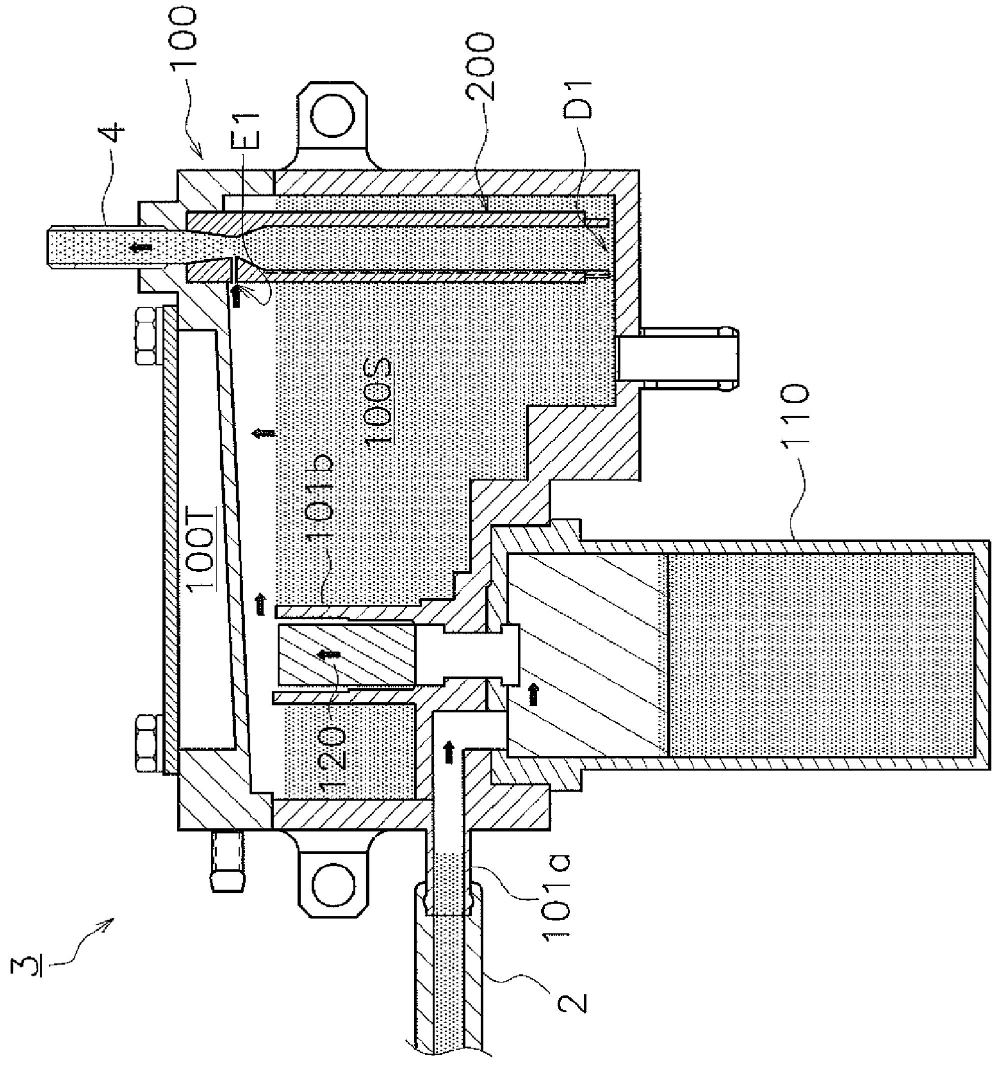
FIG. 5 is a schematic diagram for explaining a condition of the liquid fuel and a flow of the vaporized fuel inside the fuel tank on a time-series basis.

Next, as shown in FIG. 5, when the engine is started, the vaporized fuel and the liquid fuel are sucked through the vaporized-liquid fuel mixture suction portion 200 by the suction force of the fuel pump 5 connected to the vaporized-liquid fuel mixture suction portion 200, and the vaporized-liquid fuel mixture is produced inside the vaporized-liquid fuel mixture suction portion 200. At this time, the vaporized fuel inside the fuel supply pipe 2 is sucked into the fuel storage region 100S. The vaporized fuel sucked into the fuel storage region 100S is cooled down by the coolant circulating through the coolant path 100T.

Figure 6:
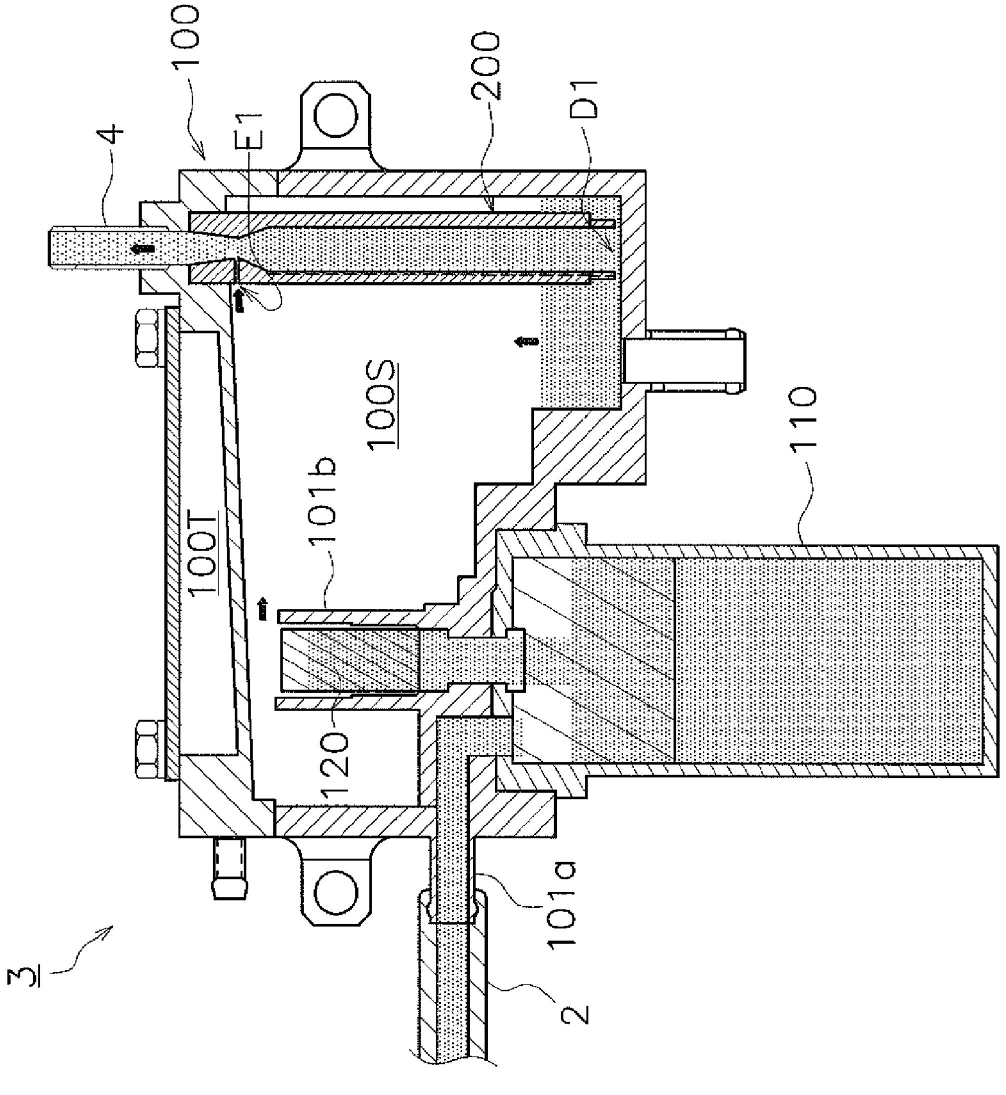
FIG. 6 is a schematic diagram for explaining a condition of the liquid fuel and a flow of the vaporized fuel inside the fuel tank on a time-series basis.

Next, as shown in FIG. 6, when the throttle valve is fully opened, the vaporized-liquid fuel mixture is successively sucked through the vaporized-liquid fuel mixture suction portion 200 by the suction force of the fuel pump connected to the vaporized-liquid fuel mixture suction portion 200, and the amount of the liquid fuel decreases in the fuel storage region 100S. At this time, suction is also applied to the vaporized fuel in the fuel storage region 100S. However, the liquid fuel is not being supplied from the strainer 120. Thus, a portion of the fuel storage region 100S occupied by the vaporized fuel increases. Pressure decreases in the portion of the fuel storage region 100S occupied by the vaporized fuel with a decrease in the amount of the liquid fuel in the fuel storage region 100S.

Figure 7:
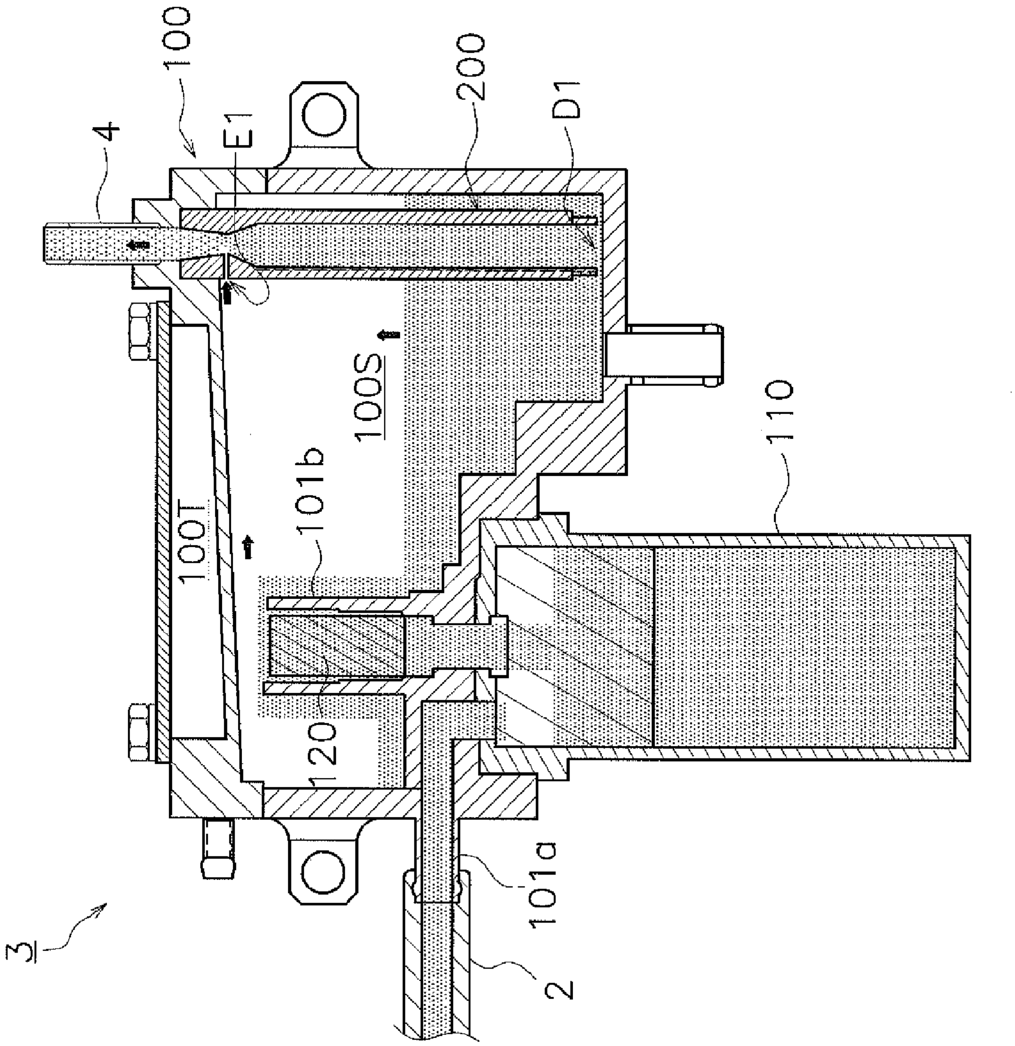
FIG. 7 is a schematic diagram for explaining a condition of the liquid fuel and a flow of the vaporized fuel inside the fuel tank on a time-series basis.

Next, as shown in FIG. 7, after a period of time since full opening of the throttle valve, the liquid fuel that has been pushed back to the interior of the fuel supply pipe 2 is sucked into the fuel storage region 100S in accordance with a decrease in pressure of the fuel storage region 100S. The liquid fuel to be sucked into the fuel storage region 100S is filtered by the filtration filter 110 and the strainer 120.

Figure 8:
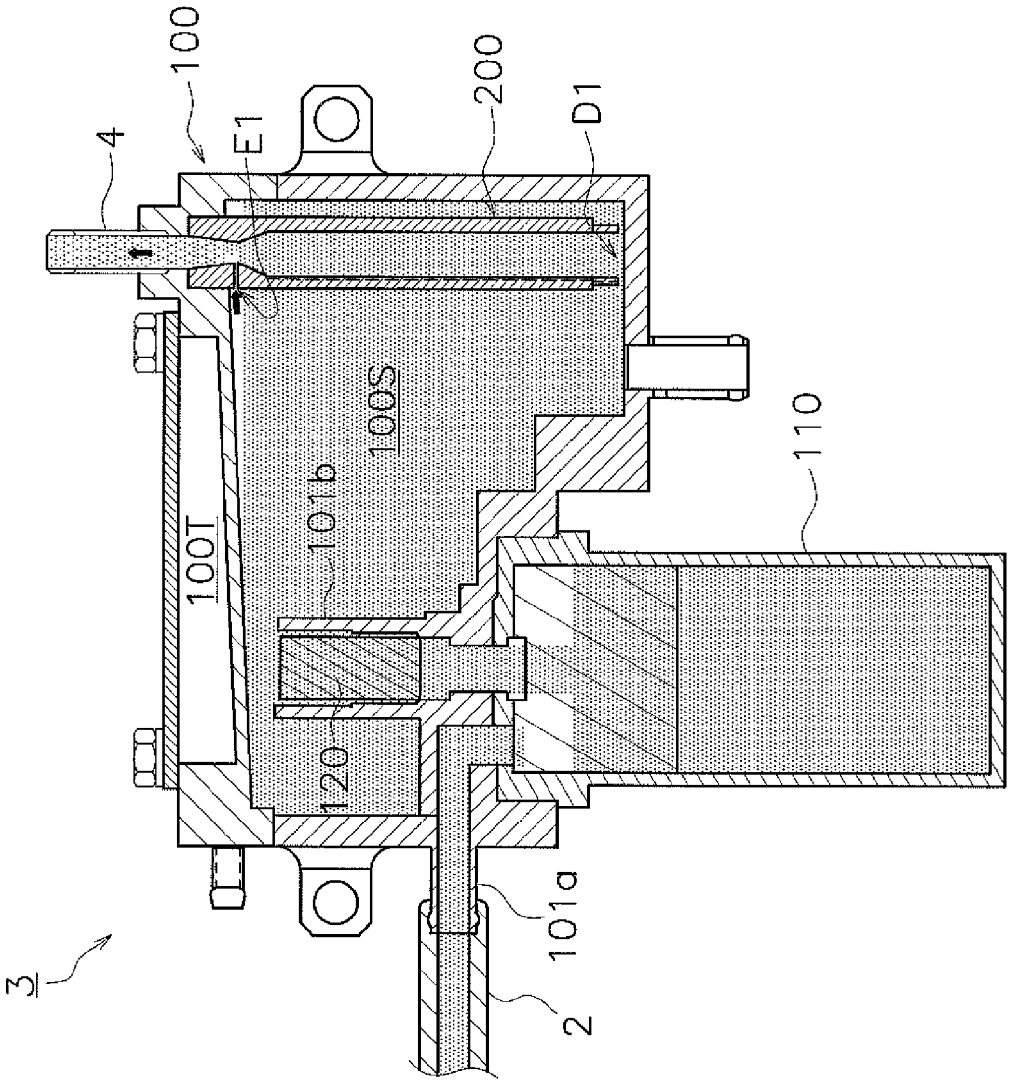
FIG. 8 is a schematic diagram for explaining a condition of the liquid fuel and a flow of the vaporized fuel inside the fuel tank on a time-series basis.

Next, as shown in FIG. 8, when full opening of the throttle valve is continued, the fuel storage region 100S is filled with the liquid fuel in accordance with consecutive suction of the vaporized-liquid fuel mixture through the vaporized-liquid fuel mixture suction portion 200. At this time, the vaporized fuel is constantly produced from the liquid fuel. The produced vaporized fuel is sucked through the vaporized fuel suction port E1.

The vaporized-liquid fuel mixture, sucked through the vaporized-liquid fuel mixture suction portion 200, is liquefied by compression of the fuel pump 5, and is then supplied to the fuel injection device 4*f* (see FIG. 1).

A structure of a boat propulsion device to which the fuel supply device 1 according to the present preferred embodiment is applied will be hereinafter explained. It should be noted that the fuel supply device 1 is also applicable to an automobile, a motorcycle or other vehicles equipped with an engine (internal combustion).

Figure 9:
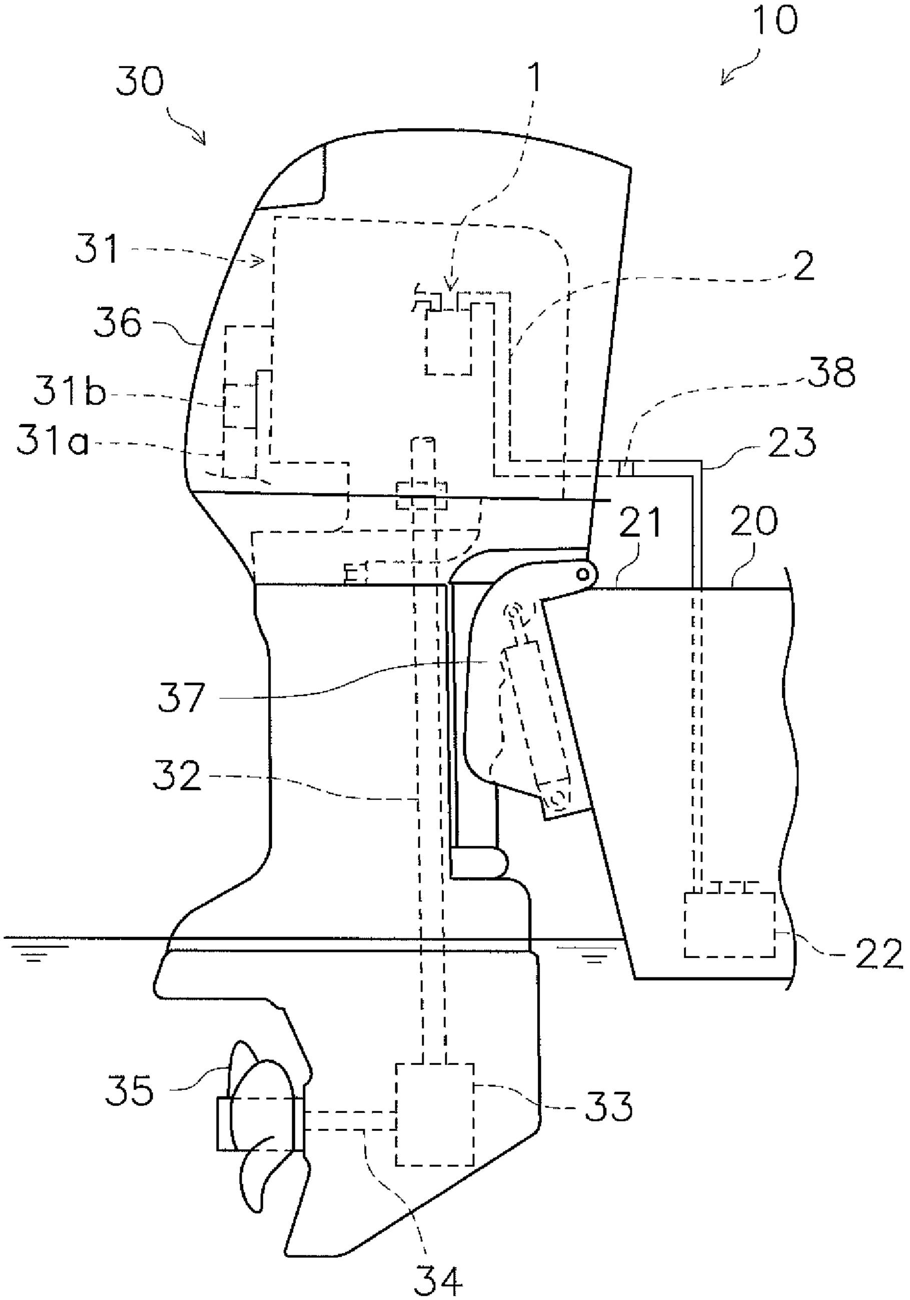
FIG. 9 is a side view of a structure of a rear end portion and the periphery thereof in a water vehicle.

FIG. 9 is a side view of a structure of a rear end portion and the periphery thereof in a water vehicle 10. The water vehicle 10 includes a hull 20 and an outboard motor 30 as a boat propulsion device.

The hull 20 includes a transom 21, an outside tank 22, and an outside hose 23. The outboard motor 30 is fixed to the transom 21. The outside tank 22 stores fuel to be supplied to the outboard motor 30. The outside hose 23 is connected to the outside tank 22 and the outboard motor 30. The fuel stored in the outside tank 22 is supplied to the outboard motor 30 through the outside hose 23.

The outboard motor 30 includes the fuel supply device 1, an engine 31, a drive shaft 32, a shift mechanism 33, a propeller shaft 34, a propeller 35, a cowling 36, a bracket 37, and a hose connector 38.

The engine 31 is an internal combustion configured to generate a driving force by burning the fuel. The engine 31 includes an exhaust pipe 31*a* and a catalyst 31*b*. The exhaust pipe 31*a* is connected to an exhaust path (not shown in the drawings). The catalyst 31*b* is accommodated in the exhaust pipe 31*a*. The drive shaft 32 is coupled to the engine 31 and is configured to be rotated by the driving force of the engine 31.

The shift mechanism 33 is disposed between the drive shaft 32 and the propeller shaft 34. The shift mechanism 33 is movable among a forward thrust position, a neutral position, and a rearward thrust position. The shift mechanism 33 is configured to switch the rotation of the propeller shaft 34 among a forward thrust state, an unmoved state, and a rearward thrust state. The propeller 35 is attached to the rear end of the propeller shaft 34.

The cowling 36 accommodates the engine 31, the fuel supply device 1, and so forth. The bracket 37 is attached to the transom 21 of the hull 20. The outboard motor 30 is supported by the bracket 37 so as to be pivotable in the right-and-left direction and the up-and-down direction.

The hose connector 38 is attached to the cowling 36. The tip of the outside hose 23 and that of the fuel supply pipe 2 are connected to the hose connector 38. The fuel, fed from the outside hose 23, is supplied to the engine 31 by the fuel supply device 1 including the fuel supply pipe 2.

Second Preferred Embodiment

Figure 10:
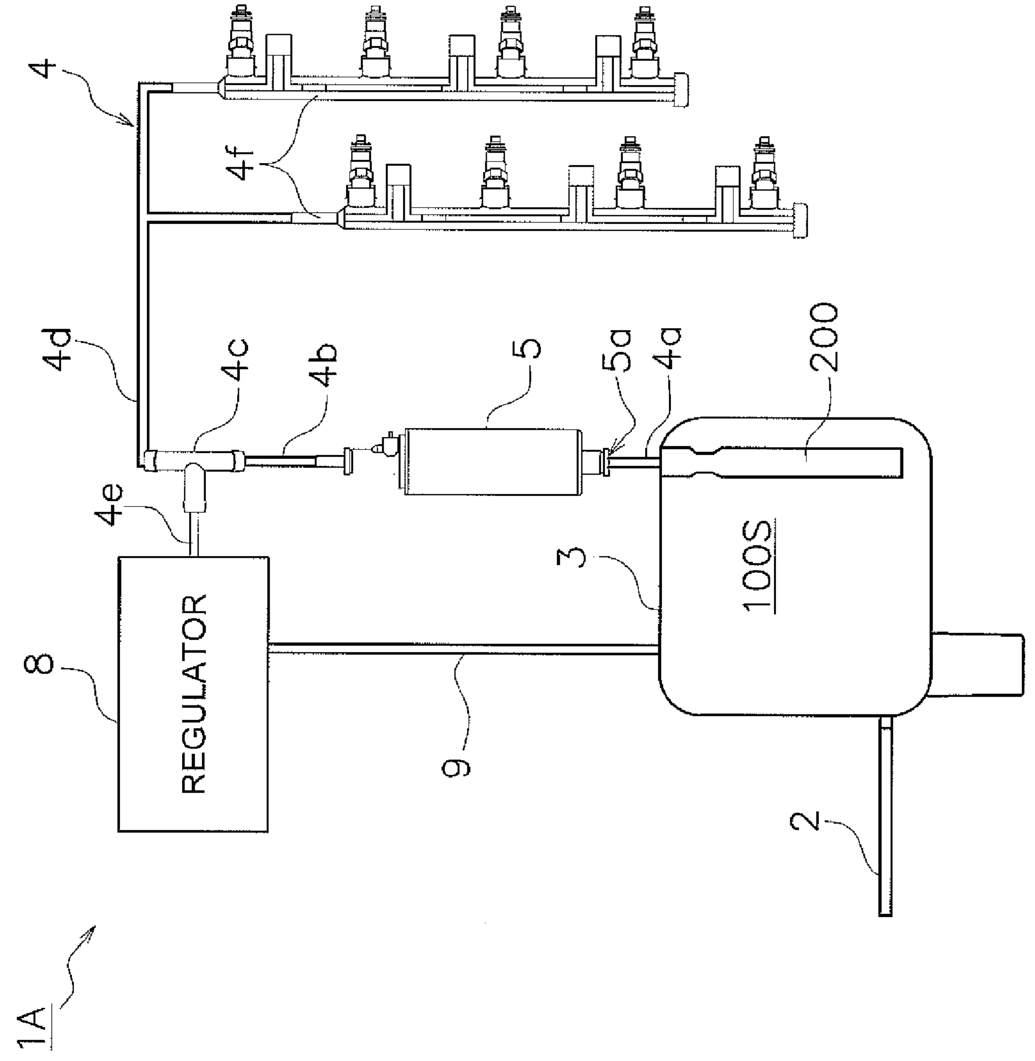
FIG. 10 is a schematic diagram of a structure of a fuel supply device according to a second preferred embodiment of the present invention.

A structure of a fuel supply device 1A according to a second preferred embodiment of the present invention will be explained. FIG. 10 is a schematic diagram of the structure of the fuel supply device 1A according to the second preferred embodiment. The fuel supply device 1A is different from the fuel supply device 1 according to the first preferred embodiment in that the fuel supply device 1A is equipped with a regulator 8 and a return path 9 instead of the fuel pressure sensor 6 and the controller 7.

The regulator 8 is connected to the fuel path 4 (the fourth fuel hose 4*e*). The regulator 8 is configured to regulate the pressure of the fuel discharged from the fuel pump 5 to be a target value by releasing or diverting a surplus fuel existing in the fuel path 4 to the return path 9. The return path 9 is connected to the fuel tank 3 and the regulator 8. The fuel released from the regulator 8 returns to the fuel tank 3 through the return path 9. A self-priming pump is preferably used as the fuel pump 5.

Similarly in the second preferred embodiment, the vaporized fuel and the liquid fuel is sucked out of the fuel storage region 100S in a sealed state by the self-priming fuel pump 5. Thus, the vaporized fuel is efficiently sucked out of the fuel storage region 100S. Hence, the fuel pump 5 continuously exerts its pump action, and further, an oil-film seal is maintained inside the fuel pump 5. As a result, the liquid fuel is quickly drawn into the fuel tank 3.

Third Preferred Embodiment

Figure 11:
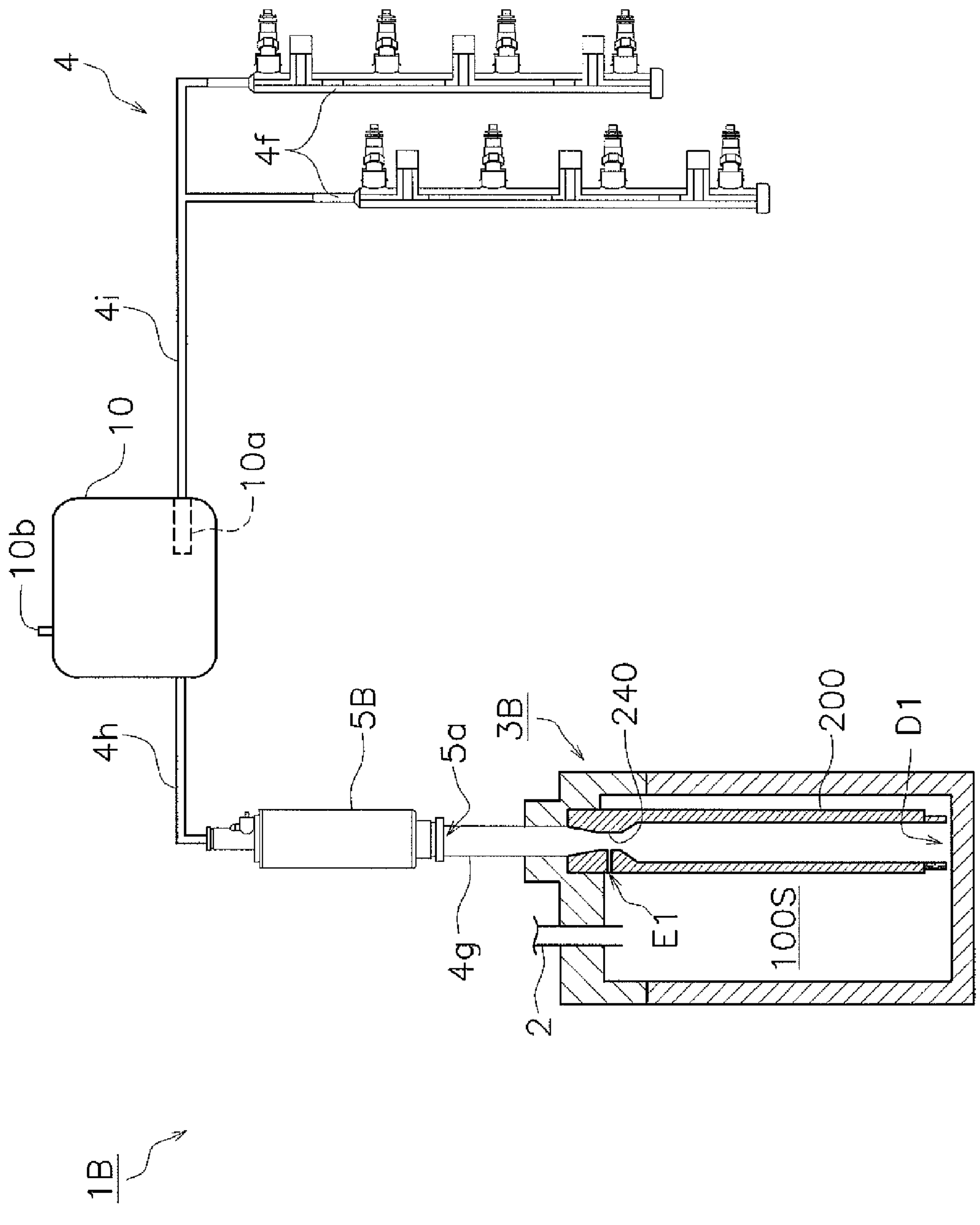
FIG. 11 is a schematic diagram of a structure of a fuel supply device according to a third preferred embodiment of the present invention.

A structure of a fuel supply device 1B according to a third preferred embodiment of the present invention will be explained. FIG. 11 is a schematic diagram of the structure of the fuel supply device 1B according to the third preferred embodiment. The fuel supply device 1B is different from the fuel supply device 1 according to the first preferred embodiment in that the fuel supply device 1B utilizes a fuel tank 3B as a sub tank to store a fuel to be supplied to a vapor separator tank (hereinafter referred to as "VST") 10.

The fuel supply device 1B includes the fuel tank 3B, a fuel pump 5B, and the VST 10.

The fuel tank 3B has a simple structure that is not provided with a filtration filter and so forth. The fuel tank 3B includes the fuel storage region 100S that is configured to store a fuel to be fed thereto through the fuel supply pipe 2. The fuel storage region 100S is a sealed region with liquid tight properties and gas tight properties. The fuel storage region 100S stores both of the liquid fuel and the vaporized fuel in a sealed state.

The vaporized-liquid fuel mixture suction portion 200 is disposed within the fuel storage region 100S. In the venturi path 240 of the vaporized-liquid fuel mixture suction portion 200, the vaporized fuel sucked through the vaporized fuel suction port E1 mixes with the liquid fuel sucked through the liquid fuel suction port D1, and thus, a vaporized-liquid fuel mixture is produced.

The fuel pump 5B is disposed in the fuel path 4. The fuel pump 5B is disposed between a fifth fuel hose 4*g* and a sixth fuel hose 4*h*. The fuel pump 5B is preferably a self-priming pump that is configured to produce negative pressure in the pump suction port 5*a*. With the production of the negative pressure in the pump suction port 5*a*, an oil-film seal is promptly recovered in the interior of the fuel pump 5B, and thus, the fuel pump 5B quickly exerts its pumping action. As a result, after driving of the fuel pump 5B is started, the vaporized fuel and the liquid fuel is sucked out of the fuel storage region 100S, and simultaneously, the fuel is sucked into the fuel storage region 100S.

The fuel pump 5B is preferably a so-called low pressure pump that is configured to produce a discharge pressure that is sufficient to feed the vaporized-liquid fuel mixture to the VST 10 from the fuel tank 3B. The fuel pump 5B is preferably configured to not liquefy the vaporized fuel contained in the vaporized-liquid fuel mixture.

The VST 10 is disposed in the fuel path 4. The VST 10 is disposed between the sixth fuel hose 4*h* and a seventh fuel hose 4*i*. The VST 10 stores the vaporized-liquid fuel mixture to be fed thereto from the fuel pump 5B. The VST 10 includes a high pressure pump 10*a* and a vapor discharge pipe 10*b*. The high pressure pump 10*a* is configured to suck the stored liquid fuel and feed it to the fuel injection device 4*f*. The vapor discharge pipe 10*b* is configured to discharge the vaporized fuel produced inside the VST 10 to the outside.

Similarly in the third preferred embodiment, the vaporized fuel and the liquid fuel is sucked out of the fuel storage region 100S in a sealed state by the self-priming fuel pump 5B. Thus, the vaporized fuel is efficiently sucked out of the fuel storage region 100S. Hence, the fuel pump 5B continuously exerts its pumping action, and further, an oil-film seal is maintained inside the fuel pump 5B. As a result, the liquid fuel is quickly drawn into the fuel tank 3B.

Fourth Preferred Embodiment

Figure 12:
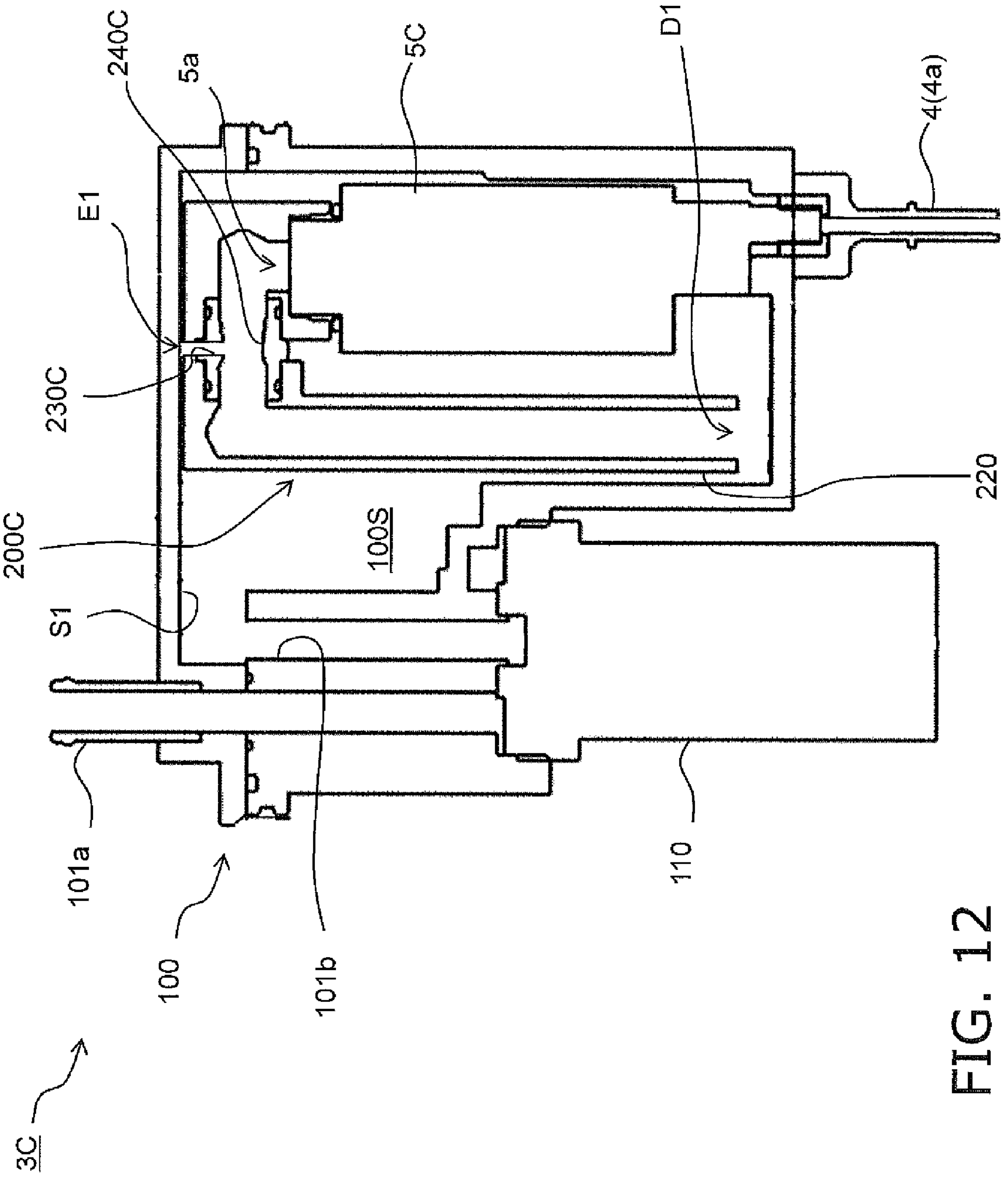
FIG. 12 is a schematic diagram for explaining a basic structure of a fuel tank according to a fourth preferred embodiment of the present invention.
Figure 13:
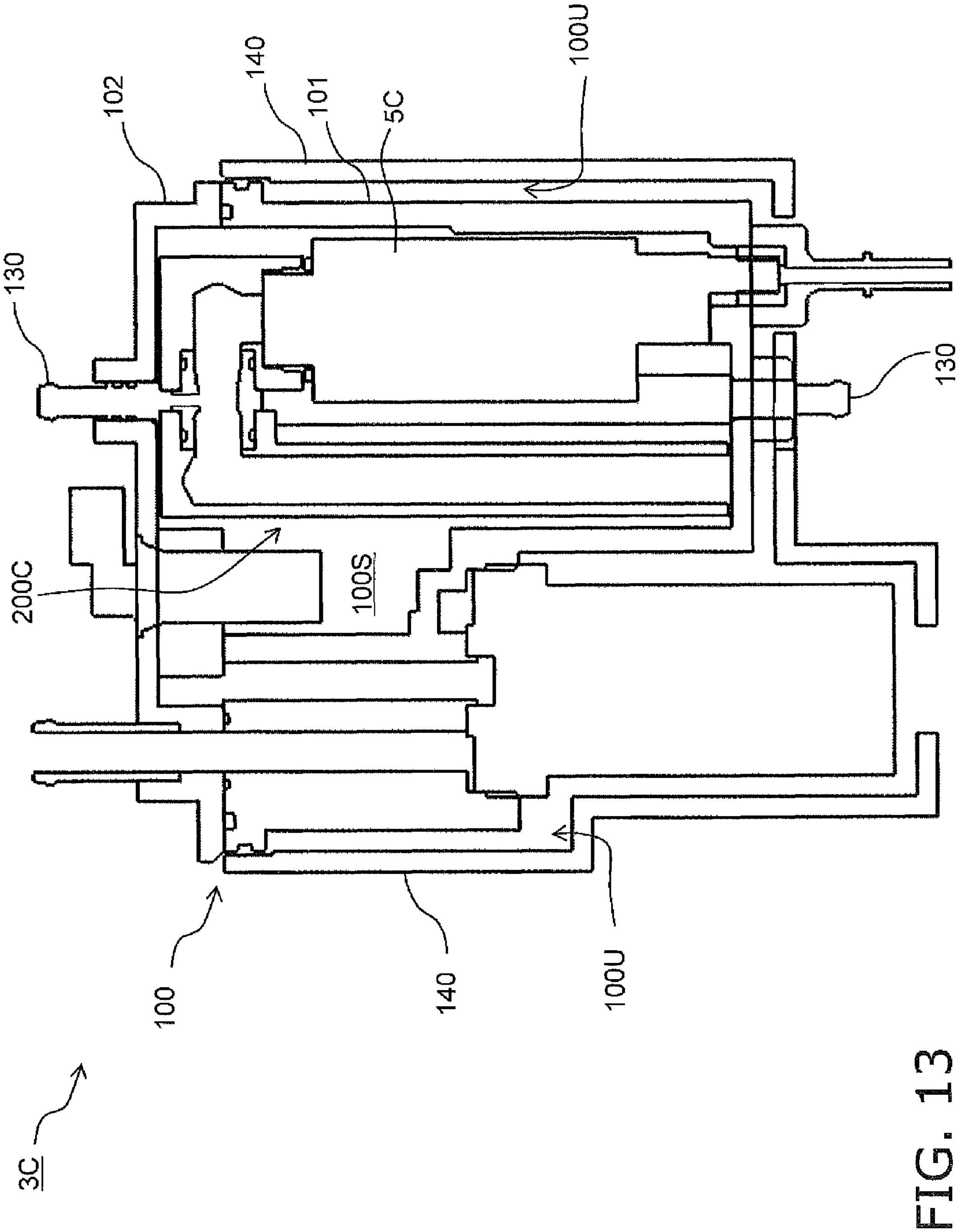
FIG. 13 is a cross-sectional view for explaining an internal structure of the fuel tank according to the fourth preferred embodiment of the present invention.

A structure of a fuel tank 3C according to a fourth preferred embodiment of the present invention will be explained. FIG. 12 is a schematic diagram for explaining a basic structure of the fuel tank 3C. FIG. 13 is a cross-sectional view of an internal structure of the fuel tank 3C. The fuel tank 3C is different from the fuel tank 3 according to the first preferred embodiment in that a fuel pump 5C of the fuel tank 3C is disposed within the fuel storage region 100S.

A vaporized-liquid fuel mixture suction portion 200C includes constituent elements similar to those of the vaporized-liquid fuel mixture suction portion 200 according to the first preferred embodiment. It should be noted that in the vaporized-liquid fuel mixture suction portion 200C, the vaporized fuel path 230C extends in the vertical direction, whereas a venturi path 240C extends in the horizontal direction. The vaporized fuel suction port E1 of the vaporized fuel path 230C is upwardly provided to oppose the top surface S1 of the fuel storage region 100S. In the present preferred embodiment, the vaporized-liquid fuel mixture suction portion 200C is directly connected to the upper end of the fuel pump 5C.

The fuel pump 5C is disposed within the fuel storage region 100S. Thus, the fuel pump 5C is cooled down by the stored fuel. Hence, an increase in the internal temperature of the fuel pump 5C is inhibited even when the flow rate of the fuel is low in the fuel pump 5C. This inhibits the occurrence of a situation that gas is produced in the fuel pump 5C and the fuel backwardly flows toward the fuel storage region 100S. Accordingly, the pressure of the fuel discharged from the fuel pump 5C is maintained at a required level.

The fuel pump 5C is preferably a self-priming pump that is configured to produce negative pressure in the pump suction port 5*a*. With the production of the negative pressure in the pump suction port 5*a*, the self-priming fuel pump 5C is enabled to suck the vaporized fuel and the liquid fuel out of the fuel storage region 100S in a sealed state. Thus, the vaporized fuel is efficiently sucked out of the fuel storage region 100S. Hence, the fuel pump 5C continuously exerts its pump action, and an oil-film seal is maintained inside the fuel pump 5C. As a result, the liquid fuel is quickly drawn into the fuel tank 3C.

The fuel pump 5C is preferably a so-called high pressure pump that is configured to produce a discharge pressure greater than or equal to a pressure at which the vaporized fuel contained in the vaporized-liquid fuel mixture liquefies. The vaporized fuel is thus liquefied in the fuel pump 5C, and hence, it is possible to actively consume the vaporized fuel together with the liquid fuel in the fuel storage region 100S. Consequently, it is not required to provide a mechanism to prevent the vaporized fuel produced in the fuel storage region 100S and the fuel path 4 from being sucked into the fuel pump 5. It should be noted that the fuel liquefied by the fuel pump 5C is downwardly discharged from the bottom surface S2 of the fuel storage region 100S.

As shown in FIG. 13, the fuel tank 3C includes a cooling path 130 and a heat insulation cover 140. The cooling path 130 extends in the up-and-down direction, and is disposed so as to penetrate through the fuel tank 3C. Coolant circulates through the interior of the cooling path 130, and the fuel (the vaporized fuel and the liquid fuel) stored in the fuel storage region 100S is cooled down by the cooling path 130. Thus, the fuel pump 5C is efficiently cooled down, and backward flowing of the fuel is reliably inhibited.

The heat insulation cover 140 encloses the lower case 101 of the chassis 100. The heat insulation cover 140 is separated away from the lower case 101. Thus, an air heat insulation layer 100U is produced between the heat insulation cover 140 and the lower case 101. The air existing in the air heat insulation layer 100U inhibits the fuel stored in the fuel storage region 100S from being heated by, for instance, the heat released from the engine. Thus, the fuel pump 5C is more efficiently cooled down, and backward flowing of the fuel is more reliably inhibited.

Other Preferred Embodiments

In the aforementioned first to fourth preferred embodiments, the fuel path 4 preferably is designed to include the single liquid fuel suction port D1, but alternatively, it may include a plurality of the liquid fuel suction ports D1. Likewise, the fuel path 4 is designed to include the single vaporized fuel suction port E1, but alternatively, it may include a plurality of the vaporized fuel suction ports E1.

In the aforementioned first to third preferred embodiments, the fuel path 4 preferably is designed to extend from the upper surface of the fuel tank 3, 3B. However, as explained in the fourth preferred embodiment, the fuel path 4 may extend from either the lateral surface or the lower surface of the fuel tank 3C.

In the aforementioned first to third preferred embodiments, the fuel pump 5, 5B preferably is designed to be disposed outside the fuel tank 3, 3B. However, as explained in the fourth preferred embodiment, the fuel pump 5C may be disposed inside the fuel tank 3C.

In the aforementioned first to fourth preferred embodiments, the vaporized-liquid fuel mixture suction port F1 preferably is designed to be disposed within the fuel storage region 100S. However, the vaporized-liquid fuel mixture suction port F1 may be disposed outside the fuel tank 3, 3B, 3C.

In the aforementioned first, second, and fourth preferred embodiments, the fuel tank 3, 3C preferably is designed to be directly connected to the outside tank 22 of the hull 20. However, a sub tank may be disposed between the fuel tank 3, 3C and the outside tank 22. The sub tank may have a capacity larger than that of the fuel tank 3, 3C.

In the aforementioned first, second, and fourth preferred embodiments, the fuel tank 3, 3C preferably is designed to include the filtration filter 110 (including the paper filter 111 and the water separation filter 112) and the strainer 120. However, the fuel tank 3, 3C may not include at least one of these components. Further or alternatively, the fuel tank 3, 3C may include another filter on an as-needed basis.

In the aforementioned first, second, and fourth preferred embodiments, the fuel tank 3, 3C preferably is designed to include the coolant path 100T located above the fuel storage region 100S. However, the fuel tank 3, 3C may not include the coolant path 100T.

In the first, second, and fourth preferred embodiments, the coolant path 100T of the fuel tank 3, 3C preferably is designed to be located above the fuel storage region 100S. However, the coolant path 100T may be located laterally to the fuel storage region 100S.

The fuel supply device 1 may include a drawing pump disposed between the vaporized-liquid fuel mixture suction portion 200 and the fuel pump 5 in the fuel path 4. A general positive displacement pump is preferably used as the drawing pump.

The fuel supply device 1 may include a drawing pump disposed between the fuel pump 5 and the fuel injection device 4*f*. A general positive displacement pump is preferably used as the drawing pump.

The fuel supply device 1 may include a drawing pump disposed between the fuel tank 3 and the outside tank 22. Drawing of the fuel to the fuel tank 3 and an increase in the pressure is simultaneously performed by the drawing pump. A general low pressure pump or a manual pump may be used as the drawing pump.

The fuel supply device 1 may include two or more fuel pumps 5. In this case, one vaporized-liquid fuel mixture suction portions 200 may be connected to each of the two or more fuel pumps 5.

A well-known fuel supply device for supplying a fuel to an engine has the chance that, when an engine stops, a liquid fuel in a fuel path is vaporized by the heat of the engine and a vapor is produced. When the vapor is sucked into a fuel pump, chances are that the discharge performance of the fuel pump degrades and the engine speed decreases.

In view of the above, Japan Laid-open Patent Application Publication No. JP-A-2010-138776 describes a structure for an automobile or motorcycle, wherein a vapor discharge pipe is branched from an intermediate portion of a fuel path connected to a fuel tank and a fuel pump and has a pressure loss greater than that of the fuel path. With this structure, the amount of the fuel inhaled from the vapor discharge pipe decreases. Thus, the vapor produced in the fuel path is discharged to the fuel tank from the vapor discharge pipe.

Japan Laid-open Patent Application Publication No. JP-A-2004-278445 describes a structure for a motorcycle, wherein an ejector is disposed in a fuel path and a vapor separator chamber is disposed between the ejector and a fuel pump. The ejector is configured to be actuated by a surplus fuel flowing back thereto from the fuel pump and draw a fuel from a fuel tank. With this structure, a vapor produced in the ejector is discharged from the vapor separator chamber.

Japan Laid-open Patent Application Publication No. JP-A-H10-122077 describes a structure for a boat propulsion device, wherein a vapor separator tank is provided with a fuel return pipe and a vapor discharge path. The fuel return pipe causes a surplus fuel in a fuel path to flow backward. The vapor discharge path continues to the outside. With this structure, a vapor produced in the vapor separator tank is discharged through the vapor discharge path.

Japan Laid-open Patent Application Publication No. JP-A-2002-130068 describes a structure for a boat propulsion device, wherein a vapor separator tank is provided with a cooling chamber through which sea water circulates and a fuel path is connected to the bottom of the vapor separator tank. With this structure, it is possible to reduce a vapor contained in a fuel to be discharged from the vapor separator tank.

To inhibit the vapor in the fuel path from being sucked into the fuel pump, various structures for discharging the vapor to the outside have been proposed as described above.

However, there is still room for simplifying the entire structure of the fuel supply device.

To achieve the aforementioned advantages and benefits, it is effective to use a fuel supply device structured as follows. The fuel supply device includes a fuel tank, a fuel path, and a fuel pump. The fuel tank includes a fuel storage region including a sealed region configured to store fuel. The fuel path includes a liquid fuel suction port and a vaporized fuel suction port, both of which are located within the fuel storage region. The fuel path is connected to an engine and the fuel tank. The fuel pump is disposed in the fuel path. The fuel pump is configured to produce a pressure greater than or equal to a pressure at which the vaporized fuel sucked through the vaporized fuel suction port liquefies.

According to the fuel supply device as described above, the fuel storage region is a sealed region. Thus, when the fuel pump is driven, the vaporized fuel is sucked through the vaporized fuel suction port, while the liquid fuel is sucked through the liquid fuel suction port. The vaporized fuel, sucked through the vaporized fuel suction port, is sucked into the fuel pump while being mixed into the liquid fuel sucked through the liquid fuel suction port. The vaporized fuel, sucked into the fuel pump, is discharged from the fuel pump after being liquefied in the fuel pump. Thus, the vaporized fuel, produced within the fuel storage region, is actively consumed as the fuel. Unlike a well-known fuel supply device, the fuel supply device described above is not required to be provided with a structure to prevent the vaporized fuel, produced within the fuel storage region and the fuel path, from being sucked into the fuel pump.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A fuel supply device configured to supply a fuel to an engine, the fuel supply device comprising:

a fuel tank including a fuel storage region including a sealed region configured to store the fuel;

a fuel path configured to be connected to the engine and the fuel tank and including a vaporized-liquid fuel mixture suction portion to suck a vaporized-liquid fuel mixture, the vaporized-liquid fuel mixture is produced by mixing of a vaporized fuel into a liquid fuel, and the vaporized fuel is produced from the liquid fuel stored in the fuel storage region; and a fuel pump disposed in the fuel path and configured to produce a negative pressure in a pump suction port connected to the vaporized-liquid fuel mixture suction portion.

2. The fuel supply device according to claim 1, wherein the fuel pump is a positive displacement pump.

3. The fuel supply device according to claim 1, wherein the fuel pump is configured to produce a discharge pressure greater than or equal to a pressure at which the vaporized fuel sucked through the pump suction port liquefies.

4. The fuel supply device according to claim 1, wherein the vaporized-liquid fuel mixture suction portion includes:

a liquid fuel suction port located within the fuel storage region;

a vaporized fuel suction port located within the fuel storage region; and a vaporized-liquid fuel mixture path configured to mix the vaporized fuel sucked through the vaporized fuel suction port into the liquid fuel sucked through the liquid fuel suction port.

5. The fuel supply device according to claim 4, wherein the vaporized fuel suction port is located higher than the liquid fuel suction port.

6. The fuel supply device according to claim 4, wherein an opening area of the vaporized fuel suction port is smaller than an opening area of the liquid fuel suction port.

7. The fuel supply device according to claim 4, wherein the vaporized-liquid fuel mixture suction portion includes a venturi path and a vaporized fuel path;

the venturi path is defined by a partial narrowing in the vaporized-liquid fuel mixture suction portion;

the vaporized fuel path extends from the vaporized fuel suction port to the venturi path;

the vaporized fuel path includes a vaporized fuel discharge port in the venturi path; and an opening area of the vaporized fuel discharge port is smaller than a cross-sectional area of the venturi path.

8. The fuel supply device according to claim 7, wherein the vaporized-liquid fuel mixture suction portion includes a liquid fuel path and a vaporized-liquid fuel mixture path, the liquid fuel path is connected to an upstream side of the venturi path and continuing to the liquid fuel suction port, and the vaporized-liquid fuel mixture path is connected to a downstream side of the venturi path.

9. The fuel supply device according to claim 8, wherein the cross-sectional area of the venturi path is smaller than a cross-sectional area of the liquid fuel path.

10. The fuel supply device according to claim 4, wherein a suction amount per unit time of the fuel pump is greater than a sum of an amount of the liquid fuel per unit time to be sucked through the liquid fuel suction port and an amount of the vaporized fuel per unit time to be sucked through the vaporized fuel suction port.

11. The fuel supply device according to claim 1, further comprising:

a regulator connected to the fuel path and configured to regulate a pressure of the fuel discharged from the fuel pump to be a target value; and a return path connected to the regulator and the fuel tank.

12. The fuel supply device according to claim 1, further comprising:

a fuel pressure sensor configured to detect a pressure of the fuel discharged from the fuel pump; and a controller configured and/or programmed to control a discharge pressure of the fuel pump based on a detection value of the fuel pressure sensor.

13. The fuel supply device according to claim 4, wherein the fuel storage region includes a top surface with a height gradually increasing toward the vaporized fuel suction port.

14. The fuel supply device according to claim 1, wherein the fuel tank includes a fuel inflow pipe extending in an up-and-down direction within the fuel storage region; and the fuel inflow pipe includes an outlet port in an upper end thereof.

15. The fuel supply device according to claim 14, wherein the fuel tank includes a strainer disposed inside the fuel inflow pipe.

16. The fuel supply device according to claim 14, wherein the fuel tank includes a filtration filter connected to a lower end of the fuel inflow pipe.

17. The fuel supply device according to claim 1, wherein the fuel tank includes a coolant path provided in the fuel storage region and configured to cause a coolant to circulate therein.

18. The fuel supply device according to claim 1, wherein the fuel pump is disposed within the fuel storage region.

19. A fuel supply method comprising:

supplying a fuel to a fuel storage region including a sealed region; and sucking a vaporized-liquid fuel mixture through a pump suction port connected to a vaporized-liquid fuel mixture suction portion disposed within the fuel storage region by producing a negative pressure in the pump suction port, the vaporized-liquid fuel mixture is produced by mixing of the vaporized fuel into the liquid fuel, and the vaporized fuel is produced from the liquid fuel stored in the fuel storage region.

20. The fuel supply method according to claim 19, further comprising:

liquefying the vaporized fuel contained in the vaporized-liquid fuel mixture by compressing the vaporized-liquid fuel mixture sucked through the pump suction port; and supplying the fuel under compression to a fuel injection device of an engine.

21. The fuel supply method according to claim 19, further comprising:

regulating a pressure of the fuel under compression to be a target value by returning a portion of the fuel under compression to the fuel storage region.

22. The fuel supply method according to claim 19, further comprising:

controlling a pressure compressing the vaporized-liquid fuel mixture to be a target value based on a pressure of the fuel under compression.

23. The fuel supply method according to claim 19, further comprising:

cooling the vaporized fuel prior to sucking the vaporized-liquid fuel mixture.

24. The fuel supply method according to claim 19, further comprising:

filtering the fuel prior to supplying the fuel to the fuel storage region.

25. A boat propulsion device comprising:

an engine; and a fuel supply device configured to supply a fuel to the engine, the fuel supply device including:

a fuel tank including a fuel storage region including a sealed region configured to store the fuel;

a fuel path connected to the engine and the fuel tank and including a vaporized-liquid fuel mixture suction portion to suck a vaporized-liquid fuel mixture, the vaporized-liquid fuel mixture is produced by mixing of a vaporized fuel into a liquid fuel, the vaporized fuel is produced from the liquid fuel stored in the fuel storage region; and a fuel pump disposed in the fuel path and configured to produce a negative pressure in a pump suction port connected to the vaporized-liquid fuel mixture suction portion.

* * * * *